United States Patent [19]

Traver et al.

[11] Patent Number: 4,791,163

[45] Date of Patent: Dec. 13, 1988

[54] SILICONE ADHESIVE AND ORGANIC ADHESIVE EMULSIONS

[75] Inventors: Frank J. Traver, Troy; Duane F. Merrill, Ballston Spa, both of N.Y.

[73] Assignee: General Electric Company, Waterford, N.Y.

[21] Appl. No.: 47,837

[22] Filed: May 6, 1987

[51] Int. Cl.$^4$ ............................................. C08L 83/00
[52] U.S. Cl. ..................................... 524/506; 524/588
[58] Field of Search ................................. 524/506, 588

[56] References Cited

U.S. PATENT DOCUMENTS 4,098,945 7/1978 Oehmke .................................. 525/98

Primary Examiner—Joseph L. Schofer
Assistant Examiner—Peter D. Mulcahy

[57] ABSTRACT

Organic pressure-sensitive adhesives are combined with silicone pressure-sensitive adhesives from water based emulsions.

18 Claims, No Drawings

SILICONE ADHESIVE AND ORGANIC ADHESIVE EMULSIONS

The present invention relates to pressure-sensitive adhesives. More particularly, the present invention relates to pressure sensitive adhesives which are applied from a water emulsion of silicone adhesives and organic adhesives.

BACKGROUND OF THE INVENTION

Organic pressure-sensitive adhesives have been finding increased utility principally to manufacture pressure sensitive adhesive tapes. For a variety of common uses, pressure-sensitive adhesive tapes manufactured with organic pressure-sensitive adhesives, have the requisite physical properties and low cost to make them very much in demand.

However, there are many uses for which pressure-sensitive tapes manufactured from organic pressure-sensitive adhesives are unsuitable. For example, organic pressure-sensitive adhesives tapes do not weather well. Such tapes have poor adhesion to low energy surfaces. These tapes have poor low temperature flexibility, and they have poor high temperature stability. Thus, organic pressure-sensitive adhesive tapes are generally unsuitable for use in outside graphics, such as striping on automobiles or graphics in windows; for use in bonding plastics and for use in conditions where temperature extremes are encountered.

Silicone pressure-sensitive adhesives are also well known adhesives and are widely employed in a variety of uses, including pressure-sensitive adhesive tape. Silicone pressure-sensitive adhesives exhibit excellent adhesion to very low energy surfaces, have excellent weatherability, are flexible at low temperature and are chemically stable at very high temperature. However, the principal drawback to a much wider spread use of silicone pressure-sensitive adhesives is cost.

Thus, the present day market in pressure-sensitive adhesives is split between high performance but costly silicone pressure-sensitive adhesives and organic pressure-sensitive adhesives which are cost effective for most uses. Of course, attempts have been made to obtain pressure-sensitive adhesives which have intermediate physical properties as well as intermediate price.

Principally, such attempts have involved blending a solution of silicone pressure-sensitive adhesive and a solution or organic pressure-sensitive adhesive and applying the blend to a tape from solution. This method has two principal drawbacks. Firstly, the silicone adhesive and the organic adhesive are incompatible. Thus, during solvent removal after application, the adhesives at some point must precipitate from solution and if solvent is not removed quickly enough, phase separation will occur. Secondly, this method requires that the two adhesives be applied from solution which obviously requires a solvent. In this case the solvent is organic solvent, the emission of which is coming under increasing regulation by both federal, state and local governments.

It is an object of the present invention to manufacture silicone and organic pressure-sensitive adhesive blends without the use of organic solvents.

It is another object of the present invention to manufacture silicone and organic pressure-sensitive adhesive blends from a water emulsion.

It is still another object of the present invention to produce a water emulsion containing silicone pressure-sensitive adhesives and organic pressure-sensitive adhesives.

DESCRIPTION OF THE INVENTION

Briefly, there is produced according to the present invention an emulsion comprising:
- (a) 100 parts by weight of a continuous phase of water;
- (b) from about 10 to about 400 parts by weight of micelles comprising:
  - (i) from about 50 to about 99% by weight of micelles comprising organic pressure-sensitive adhesive, and
  - (ii) from about 1 to about 50% by weight of micelles comprising silicone pressure-sensitive adhesive; and
- (c) an effective amount of emulsifying agent effective to maintain the emulsion.

Organic pressure-sensitive adhesives for use herein may be applied with hand pressure and will stick aggressively to most common surfaces. Generally organic pressure-sensitive adhesives are manufactured from a base elastomer rubber which is either natural or synthetic. Base rubbers for organic pressure sensitive adhesives include milled natural rubber, reclaimed rubber, styrene-butadiene rubber, butyl rubber, butadiene-acrylonitrile rubber, polyvinyl ether rubbers, polyacrylate ester rubber, styrene-butadiene-styrene rubber, styrene-isoprene-styrene rubber, etc.

To manufacture a pressure sensitive adhesive, the base rubber is compounded with other base rubbers and with additives which have a variety of functions. Tackifiers improve the surface wetting or tack of the adhesive to a variety of substrates. Plasticizers, fillers, and antioxidants are added for their art known purposes.

Preferred as the pressure sensitive adhesive herein are the acrylate pressure sensitive adhesives which are normally a copolymer of a higher alkyl acrylate such as 2-ethyl hexyl acrylate copolymerized with a small amount of a polar comonomer. Suitable comonomers include acrylic acid, acrylamide, maleic anhydride, diacetone acrylamide, and long chain alkyl acrylamides. Suitable pressure-sensitive acrylic adhesives are described in U.S. Pat. Nos. Re 24,906; 3,558,574; 3,535,293; and 3,299,010, hereby incorporated by reference.

Silicone pressure-sensitive adhesives suitable for use herein are well known in the art. In brief, these adhesives contain a mixture of silicone resins and silicone fluids. The silicone resins are generally referred to as MQ resins which contain M units, represented by the formula $R_3SiO_{\frac{1}{2}}$, and Q units, represented by the formula $SiO_{4/2}$, where R is a monovalent hydrocarbon radical. Generally, such resins contain 1 to 2 Q units for each M unit. The silicone fluids are linear, high viscosity organopolysiloxane fluids having a viscosity between about 50,000 and 3,000,000 centipoise and containing terminal silicon-bonded hydroxyl groups used for co-reacting with the above described MQ resins.

These silicone pressure-sensitive adhesives are blended and cured by reacting the resins with the fluids in a condensation reactor. Typically, for each part by weight of resin, there is added from 0.5 to 6 parts by weight fluid.

Curing may be further promoted by adding a peroxide or by adding a catalyst and an alkoxy silane. Either method of cure promotion will increase the cross-link density of the adhesive. Of course, the silicone composition should not be cross-linked beyond the point where it is no longer tacky on the surface. Further discussion of cross-linkers may be found in our docket number 60SI-1129, filed herewith and hereby incorporated by reference.

For use herein, the silicone adhesive material must be carried in a non-polar solvent. Thus, to handle the silicone adhesive, there is required at least about 1 part by weight non-polar solvent for 10 parts by weight silicone adhesive. Suitable non-polar solvents include toluene, xylene, etc. Preferably there is used from 2 to about 9 parts by non-polar solvent for each 10 parts by weight silicone adhesive.

Suitable silicone pressure-sensitive adhesives are described in detail in U.S. Pat. No. 2,857,356 to Goodwin; U.S. Pat. No. 2,736,721, to Dexter; and U.S. Pat. No. 2,814,601 to Currie, et al. All of these patents are incorporated herein by reference.

It is the function of the emulsifying agent or agents to maintain both the micelles of silicone adhesive and micelles of organic adhesive in a substantially stable state of suspension. For use herein, the emulsion must be stable even at low water content so that drying of the adhesive coat may be accomplished prior to phase separation of the silicone adhesive and the organic adhesive. Thus, to determine whether any given emulsifying agent is suitable for use herein, persons skilled in the art must determine (1) whether a stable emulsion of silicone adhesive and organic adhesive in water is obtained, and (2) whether the emulsion is maintained far enough into the drying step that phase separation does not occur during drying. If the emulsion breaks too soon in the drying process, phase separation of the silicone adhesive and organic adhesive will form two layers of adhesive rather than an interpenetrating network. Persons skilled in the art can easily test emulsifying agents and emulsions.

Specific emulsifying agents and amounts utilized will vary depending on circumstance. Suitable emulsifying agents include both ionic and nonionic agents. These agents may have an HLB number ranging from 1 to 40 but generally the HLB number will run from about 6 to about 20. It is preferred that emulsifying agent be effective in the range of from about ½ to about 3 parts by weight for each 100 parts by weight water. Suitable emulsifying agents and the use are more fully described in the Encyclopedia of Chemical Technology, vol. 8, pages 900–930, John Wiley and Sons, 1979.

In emulsions of silicone adhesive with styrene-butadiene rubber, primary or secondary amine salts of organic acids have been found effective as emulsifying agents. The organic acids should have from about 2 to about 30 carbon atoms in the backbone and may be unsaturated. Suitable acids include butyric acid, caproic acid, lauric acid, etc. The preferred organic acid is undecylenic acid. The primary or secondary amine includes aliphatic amines, substituted aliphatic amines, unsaturated organic amines, cycloaliphatic amines, substituted cycloaliphatic amines, unsaturated cyclo-organic amines, etc. A preferred amine is morpholine.

In emulsions of silicone adhesives with acrylic adhesives, ethoxylates have been found suitable as the emulsifying agent. Suitable ethoxylates include those of the general formula:

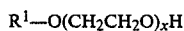

$$R^1\text{---}O(CH_2CH_2O)_xH$$

where x ranges from about 1 to 20 and $R^1$ is an alkyl or aryl group. Preferred R groups are aryl and include p-methyl phenyl, phenyl, p-ethyl phenyl, p-octyl phenyl, etc.

The emulsion herein may be prepared by known methods. For example, the silicone in water emulsion and acrylic in water emulsion may be prepared separately and combined or the emulsions may be prepared simultaneously in a single batch. Preparation of the emulsion should be such to result in an adhesive micelle size ranging from about ¼ to about 3 microns in diameter. Micelle size should average about 1 micron.

Adhesive emulsions for application to a substrate generally contain from about 10 to about 400 parts by weight of adhesive solids, i.e. micelles of adhesive for each 100 parts by weight water. Preferably, the solids should range from about 15 to about 200 parts and more preferably from about 20 to about 100 parts by weight for each 100 parts by weight of water.

Of the adhesive solids, the silicone pressure-sensitive adhesive should comprise from about 1 to about 50% by weight with the organic pressure-sensitive adhesive making up the corresponding 50 to 99%. Preferably, the silicone adhesive should comprise from about 3 to about 30% by weight of the adhesive solids with the balance, 70 to 97%, being organic adhesive.

The adhesive emulsion, once formed is simply applied to a substrate and dried by known methods. Of course, drying the emulsion should be performed as quickly as possible to minimize the time in which the emulsion may break and phase separate.

In order to enable persons skilled in the art to practice the present invention. The following examples are offered by way of illustration and not by way of limitation. All parts are in parts by weight.

EXAMPLES

Example 1

A solution was prepared containing 2% by weight methylcellulose, Methocel A15LV cellulose ether, 2% by weight hydroxypropyl methylcellulose, Methocel E50LV cellulose ether, 1% by weight biocide, and 95% by weight water. Recommended procedures were followed by dispersing the powder in hot water and quenching with cold water. This solution is subsequently referred to as the methylcellulose solution.

To a one liter stainless steel beaker there was added 360 grams silicone adhesive, a 60% solids in toluene 68/60 ratio by weight of MQ resin/silicone fluid, and 120 grams of toluene. The materials were blended to form a solution. As an emulsifier there was added 8 grams undecylenic acid followed by 4 grams of morpholine dissolved in 228 grams of water. This mixture was mixed using a high shear agitator and once uniform, 80 grams of methylcellulose solution was added with continued high shear agitation for 3 additional minutes. This emulsion was filtered through viscon paper and the physical properties were measured as follows:

Solids: 30% by weight;
Viscosity: 375 cps at 25° C.;
Centrifuge stability
Top: 1 cc oily cream;
Bottom: 0.5 cc aqueous.

Example 2

Prepared an emulsion from 400 grams silicone adhesive, a 55% by weight solids in toluene 61/39 weight ratio of MQ resin/silicone fluid mixture, and 32 grams toluene solution by blending solution with 8.8 grams octylphenoxy polyethoxy ethanol, Triton X-405 (nonionic emulsifier) in a one liter stainless steel beaker equipped with an air stirrer. Once the emulsifier—silicone—toluene were fully blended, there was slowly added 343 grams water. Next the premix was emulsified using a high shear mixer ("Willems Polytron"). After blending two minutes on Polytron, the emulsion was filtered through viscon and certain physical properties run.
Solids: 26.1%.
Centrifuge stability
Top: 4.0 cc cream,
Bottom: 2.0 cc aqueous.

Example 3

Prepared an emulsion by blending 445 grams silicone adhesive, a 55% weight solids in toluene 61/39 weight ratio of MQ resin/silicone fluid mixture, with 7.4 grams undecylenic acid in a one liter stainless steel beaker equipped with air stirrer. Then added 3.7 gram Morpholine dissolved in 285.5 grams water followed by 20 grams toluene and 75 grams methylcellulose solution (Example 1). The premix was homogenized on the Polytron, medium speed, for a couple of minutes. Once prepared, the emulsion was filtered through viscon and physical properties were run.
Solids: 29.5%.
Centrifuge stability
Top: 0.5 cc cream,
Bottom: 0.1 cc aqueous.

Example 4

Prepared an emulsion by blending 600 grams silicone adhesive, a 55% by weight solids in toluene 61/39 weight ratio of MQ resin/silicone fluid mixture, with 100 grams methylcellulose solution. Then charged a solution of 2 grams solium lauryl sulfate in 298 grams water. Stirred mixture in a 1.5 L stainless steel beaker using an air stirrer. Then homogenized using a high shear mix Polytron II. Once the emulsion was prepared several physical properties were run.
Solids: 33.2%,
Viscosity 320 cps.
Centrifuge stability
Top: Nil,
Bottom: 0.5 cc aqueous.

Example 5

Prepared an emulsion by blending 600 grams silicone adhesive, a 55% by weight solids in toluene 61/39 weight ratio of MQ resin/silicone fluid mixture, with 100 grams methylcellulose solution (Example 1) and then adding a sodium lauryl sulfate solution prepared from 2 grams sodium lauryl sulfate dissolved in 298 grams water. The premix was stirred at room temperature for about half an hour before being homogenized using a high shear mixer. Once prepared, several properties were determined on the emulsion.
Solids: 35.7%,
Viscosity 340 cps.
Centrifuge stability
Top: Nil,
Bottom: 3.5 cc aqueous.

Example 6

To 100 grams of styrene-butadiene rubber emulsion at 43% solids there was added 7.4 grams of the emulsion from Example 1. The resulting mixture contained 5% silicone based on total solids. A 10% and 30% silicone mixture was also made. The mixtures were found to be completely compatible. A 4 mil wet coating of the mixtures was applied to paper and dried 2 minutes at 300° F. One inch wide strips were cut from the coated paper. The strips were placed adhesive side down on silicone release coated paper and vinyl film. The laminates were rolled with a 4.5 lb. rubber ASTM roller and set aside for a 24 hours dwell time prior to testing for adhesion to the release paper and vinyl film. The paper and vinyl strips were then clamped on a Scott Tester and the adhesive coated paper was pulled from the substrates at a 180° angle at 12 inches per minute.

| % Silicone | Adhesion to Silicone Coated Paper | Adhesion to Vinyl |
| --- | --- | --- |
| 0% | 5 grams | 0 grams |
| 5% | 70 grams | 180 grams |
| 10% | 75 grams | 200 grams |
| 30% | 230 grams | 200 grams |

Example 7

Attempted to prepare an emulsion as in Example 6 using the silicone emulsion from Example 2. The emulsions were found to be incompatible.

Example 8

A pressure sensitive tape was prepared as in Example 6 using the silicone emulsion of Example 3. The following results were obtained.

| % Silicone | Adhesion to Silicone Coated Paper | Adhesion to Vinyl |
| --- | --- | --- |
| 0% | 5 grams | 0 grams |
| 5% | 32 grams | 74 grams |
| 10% | 40 grams | 175 grams |
| 30% | 54 grams | 182 grams |

Example 9

Attempted to prepare an emulsion as in Example 6 from the silicone emulsion of Example 4. The emulsions were found to be incompatible.

Example 10

Attempted to prepare an emulsion as in Example 6 from the silicone emulsion of Example 5. The emulsions were found to be incompatible.

Example 11

Prepared an emulsion by blending 1925 grams of 60% solids in toluene silicone adhesive, a 68/60 weight ratio of MQ resin/silicone fluid, with 825 grams odorless mineral spirits. Once the blend is uniform there was added 154 grams octylphenoxy polyethoxy ethanol, Triton X-114, and 66 grams octylphenoxy polyethoxy ethanol, in a stainless steel beaker equipped with hot plate (for heat), thermometer and air stirrer. After the material was blended, a blend of 1210 grams of water and 3.0 grams biocide was slowly added. The emulsion partially inverts (turns milky). This premix was then milled through a Manton Gaulin colloid mill (5 mil gap and 10 psig pressure) into an additional 1317 grams water and blended.

Solids: 24.9%
Viscosity 120 cps
Centrifuge stability
U6: Top: 1 cc oil,
Bottom: 6.0 cc water.

Example 12

To 100 grams of acrylic emulsion there was added 10.45 grams of silicone emulsion from Example 11. The resulting mixture contained 5% silicone PSA based on total soids. A 10% and 30% silicone mixture was also made. The mixtures were found to completely compatible. A 4 mil wet coating of the mixtures was applied to 2 mil mylar film and dried for 2 minutes at 95° C. followed by 2 minutes at 165° C. One inch wide strips of the coated mylar were placed adhesive side down on silicone release coated super calendered kraft paper. Following a 20 minute dwell time the adhesive coated mylar was separated from the release coated paper at a 180° C. angle at 12 inches per minute using a Scott Tester.

| % Silicone | Adhesion to Silicone Coated Paper |
| --- | --- |
| 0% | 5 grams per inch width |
| 5% | 80 grams per inch width |
| 10% | 95 grams per inch width |
| 30% | 305 grams per inch width |

Example 13

To 100 grams of acrylic emulsion there was added 95 grams of silicone emulsion from Example 1. The resulting mixture contained 5% silicone based on total solids. A 10% and 30% silicone mixture was also made. The emulsions were tested as in Example 12. There was no adhesion to silicone release coated paper.

Example 14

The mixtures of silicone and acrylic emulsions shown in Example 12 were tested for shear resistance at 70° C. To this case, the shear resistance test was conducted by overlapping and bonding two strips of one inch wide tape, adhesive face to adhesive face, for a distance of one inch. One end was suspended from a fixed bar and from the other end was hung a two hundred gram weight. The apparatus was placed in a 70° C. oven. It was found that the mixture dried on mylar has no shear resistance at 70° C.

Example 15

The mixture of silicone and acrylic emulsions shown in Example 12 were catalyzed with 2% benzoyl peroxide based on the silicone solids part of the mixture only. The catalyzed mixtures were applied to mylar and dried as shown in Example 14. The dried adhesive was tested for shear resistance at 70° C. There was no shear failure after 600 hours.

What is claimed is:

1. A emulsion comprising:
   (a) 100 parts by weight of a continuous phase of water;
   (b) from about 10 to about 400 parts by weight of a mixture of micelles comprising:
      (i) from about 50 to about 99% by weight of said micelles comprising organic pressure-sensitive adhesive which is selected from the group consisting of milled natural rubber, styrene-butadiene rubber, butyl rubber, butadiene-acrylonitrile rubber polyvinyl ether rubber, polyacrylate ester rubber, styrene-butadiene-styrene rubber, and styrene-isoprene-styrene rubber, and
      (ii) from about 1 to about 50% by weight of said micelles comprising silicone pressure-sensitive adhesive; and
   (c) an effective amount of emulsifying agent effective to maintain the emulsion.

2. The emulsion of claim 1 wherein said silicone pressure-sensitive adhesive is a mixture of silicone resin and silicone fluid.

3. The emulsion of claim 1 wherein said organic pressure sensitive adhesive is selected from styrene-butadiene rubber and said emulsifying agent is a primary or secondary amine salt of an organic acid.

4. The composition of claim 3 wherein said primary or secondary amine salt of an organic acid is the morpholine salt of undecylenic acid.

5. The emulsion of claim 1 wherein said organic pressure-sensitive adhesive is selected from acrylic rubber and said emulsifying agent is an ethoxylate.

6. The emulsion of claim 5 wherein said ethoxylate is an aryl ethoxylate.

7. The emulsion of claim 1 wherein said emulsifying agent is present in an amount of from about ½ to about 3 parts by weight for each 100 parts by weight water.

8. The emulsion of claim 1 wherein said micelles comprise:
   (i) from about 3 to about 30% by weight of micelles comprising organic pressure-sensitive adhesive, and
   (ii) from about 70 to about 97% by weight of micelles comprising silicone pressure-sensitive adhesive.

9. A method for forming a pressure-sensitive adhesive comprising:
   (A) forming an emulsion in 100 parts by weight of water, containing from about 10 to about 400 parts by weight of adhesive solids as a mixture of micelles comprising (i) from about 50 to about 99% by weight of said micelles of organic pressure-sensitive adhesive which is selected from the group consisting of milled natural rubber, styrene-butadiene rubber, butyl rubber, butadiene-acrylonitrile rubber, polyvinyl ether rubber, polyacrylate ester rubber, styrene-butadiene-styrene rubber, and styrene-isoprene-styrene rubber, and (ii) from about 1 to about 50% by weight of said micelles of silicone pressure-sensitive adhesive, employing an effective amount of emulsifying agent;
   (B) applying the resultant emulsion to a substrate; and
   (C) drying said resultant emulsion.

10. The process of claim 9 wherein a silicone pressure-sensitive adhesive in water emulsion and organic pressure-sensitive adhesive in water emulsion are emulsified separately and blended.

11. The process of claim 9 wherein said organic pressure-sensitive adhesive is selected from the group consisting of milled natural rubber, styrene-butadiene rubber, butyl rubber, butadiene-acrylonitrile rubber, polyvinyl ether rubber, polyacrylate ester rubber, styrene-butadiene-styrene rubber, and styrene-isoprene-styrene rubber.

12. The process of claim 9 wherein said silicone pressure-sensitive adhesive is a mixture of silicone resin and silicone fluid.

13. The process of claim 9 wherein said organic pressure sensitive adhesive is selected from styrene-butadiene rubber and said emulsifying agent is a primary or secondary amine salt of an organic acid.

14. The process of claim 13 wherein said primary or secondary amine salt of an organic acid is the morpholine salt of undecylenic acid.

15. The process of claim 9 wherein said organic pressure-sensitive adhesive is selected from acrylic rubber and said emulsifying agent is an ethoxylate.

16. The process of claim 15 wherein said exthoxylate is an aryl ethoxylate.

17. The process of claim 9 wherein said emulsifying agent is present in an amount of from about ½ to about 3 parts by weight for each 100 parts by weight water.

18. The process of claim 9 wherein said micelles comprise:
 (i) from about 3 to about 30% by weight of micelles comprising organic pressure-sensitive adhesive, and
 (ii) from about 70 to about 97% by weight of micelles comprising silicone pressure-sensitive adhesive.

* * * * *